UNITED STATES PATENT OFFICE.

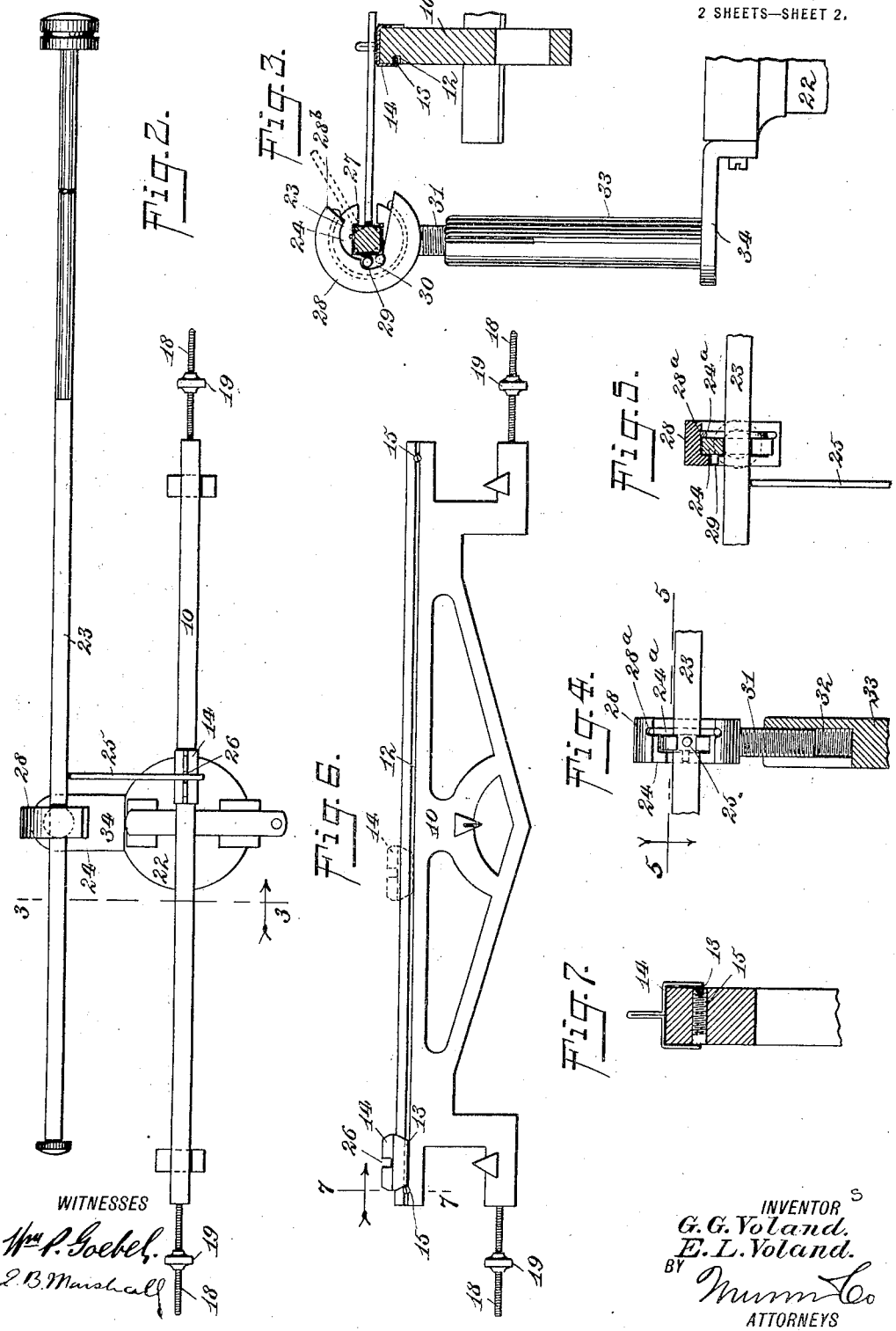

GEORGE GOTTFRIED VOLAND AND EMIL LUDWIG VOLAND, OF NEW ROCHELLE, NEW YORK.

SCALE.

1,332,783.	Specification of Letters Patent.	Patented Mar. 2, 1920.

Application filed July 22, 1919. Serial No. 312,626.

*To all whom it may concern:*

Be it known that we, GEORGE G. VOLAND and EMIL L. VOLAND, both citizens of the United States, and residents of New Rochelle, in the county of Westchester and State of New York, have invented a new and Improved Scale, of which the following is a full, clear, and exact description.

The object of this invention is to provide a scale with novel means for shifting a weight on the scale beam.

Additional objects of the invention will appear in the following specification in which the preferred form of our invention is described.

In the drawings, similar reference characters refer to similar parts in all the views, in which Figure 1 is a front elevation showing our improved scale;

Fig. 2 is a plan view of the scale beam and the means for shifting the weight thereon;

Fig. 3 is an enlarged sectional view on the line 3—3 of Fig. 2;

Fig. 4 is a fragmentary sectional view showing the means for supporting the bearing through which the rod is disposed;

Fig. 5 is a sectional view on the line 5—5 of Fig. 4;

Fig. 6 is a rear view of the scale beam; and

Fig. 7 is an enlarged sectional view on the line 7—7 of Fig. 6.

Figure 1:
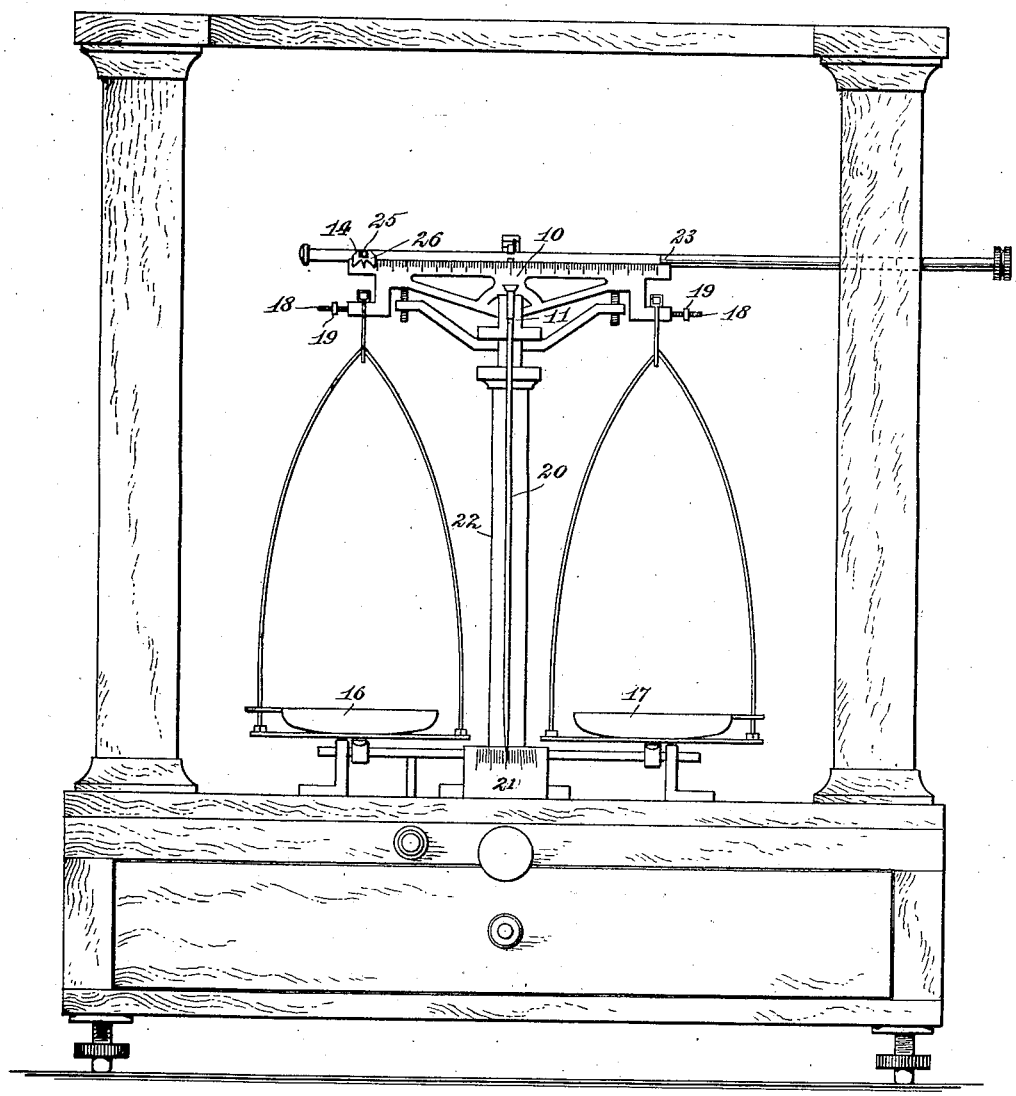

In weighing diamonds, it is not only necessary that a highly sensitive scale be employed, but it is also important that there be convenient means for operating the scale, which, of course, must have a very delicate adjustment. Our invention includes an arm mounted on a rod which moves longitudinally, the arm being adapted to engage a recess in a weight for shifting the latter on a scale beam when the rod is moved longitudinally, it being possible to remove the arm from the recess in the weight by a rocking movement of the rod.

By referring to the drawings, it will be seen that the scale beam 10 is fulcrumed on a scale beam support 11 in a well known manner, the scale beam having a longitudinal guideway 12 preferably at its rear side in which is disposed a guide 13 on a weight 14, slidable on the scale beam 10. There are screws or pins 15 adjacent the ends of the scale beam 10, and in the guideway 12 to limit the longitudinal movement of the weight 14 on the scale beam 10.

As illustrated in Fig. 1 of the drawings, scale pans 16 and 17 are supported at the ends of the scale beam 10 in a well known manner, there being screws 18 extending from the ends of the scale beam on which mesh nuts 19; it being possible to turn these nuts as may be desired for purposes of adjustment.

Depending from the scale beam 10, there is a pointer 20 which may be compared with the marks 21 at the base of the post 22, which carries the scale beam support 11 to determine when the scale beam is balanced. In using the scale which is especially designed for weighing diamonds, the diamond to be weighed is disposed in the pan 16 and one or more carat weights are disposed in the other pan 17. The weight 14 is then moved along the scale beam 10 to determine how much in addition to the carat weights the diamond weighs.

As a means for moving the weight 14 along the scale beam 10, we provide a rod 23 which is rectangular in cross section and which slides in a bearing 24 which has its bearing surface rectangular in cross section. An arm 25 extends from the rod 23 for disposal in the recess 26 in the weight 14. It will be seen that by moving the rod 23 longitudinally when the arm 25 is disposed in the recess 26, the weight 14 may be moved along the scale beam 10. It will also be understood that the rod 23 together with its bearing 24 may be rocked or rotated to move the arm 25 away from the recess 26 and the weight 14 to permit of the free movement of the scale beam 10 to determine whether the weight 14 has been moved to correct position.

The bearing 24 has an opening 27 through which the arm 25 may pass when the arm 25 is moved with the rod 23 from one side of the bearing 24 to the bearing's other side. The outer side of the bearing 24 is circular and is disposed in a bearing 28 so that the bearing 24 may be rocked with the rod 23 to move the arm 25 away from the recess 26 and the weight 14. The bearing 24 is held in the bearing 28 by means of a spring 24$^a$ which presses against the bearing 24 and which is disposed in a recess 28$^a$ in the bearing 28. The bearing 28 has an opening 28$^b$ through which the arm 25 may pass. There is a pin 29 on the bearing 24 which moves in a recess 30 in the bearing 28 to limit the rocking movement of the bearing 24 relatively to the bearing 28. The bearing 28 has a screw 31 which meshes in a threaded opening 32 in a post 33 which is disposed on a bracket 34 at the rear of the post 22.

Having thus described our invention, we claim as new and desire to secure by Letters Patent:

1. In a scale, a scale beam, a weight movable longitudinally thereon and having a recess in its upper surface, a rod movable parallel to the beam and adapted to be rocked, and an arm on the rod for disposal in the recess.

2. In a scale, a scale beam having a longitudinal guideway, a weight movable longitudinally thereon and having a guide disposed in the guideway, there being a recess in the weight, a rod movable parallel to the beam and adapted to be rocked, and an arm on the rod for disposal in the recess.

3. In a scale, a scale beam, a weight movable longitudinally thereon and having a recess, a rod, an arm on the rod for disposal in the recess, and a bearing in which the rod is disposed provided with an opening through which the arm may pass.

4. In a scale, a scale beam, a weight movable longitudinally thereon and having a recess, a rod angular in cross section, an arm on the rod for disposal in the recess, an angular bearing in which the rod is disposed, a second bearing in which the first bearing may be rocked, the two bearings being provided each with an opening through which the arm may pass.

5. In a scale, a scale beam, a weight movable longitudinally thereon and having a recess, a rod angular in cross section, an arm on the rod for disposal in the recess, an angular bearing in which the rod is disposed, a second bearing in which the first bearing may be rocked, the two bearings being provided each with an opening through which the arm may pass, and means to limit the rocking movement of the first bearing.

6. In a scale, a scale beam, a weight movable longitudinally thereon and having a recess, a rod, an arm on the rod for disposal in the recess, a post having a thread, a bearing in which the rod is disposed provided with an opening through which the pin may pass, and a mounting for the bearing having a threaded portion meshing with the thread on the post.

GEORGE GOTTFRIED VOLAND.
EMIL LUDWIG VOLAND.